(12) United States Patent
Suzuki

(10) Patent No.: US 7,052,406 B2
(45) Date of Patent: May 30, 2006

(54) BOWLING PIN AND MANUFACTURING METHOD OF THE SAME

(75) Inventor: Nobufumi Suzuki, Shizuoka (JP)

(73) Assignee: Hamamatsu Kenma Co., Ltd., Shizuoka (JP)

( * ) Notice: Subject to any disclaimer, the term of this patent is extended or adjusted under 35 U.S.C. 154(b) by 93 days.

(21) Appl. No.: 10/735,859

(22) Filed: Dec. 16, 2003

(65) Prior Publication Data
US 2004/0180727 A1 Sep. 16, 2004

(30) Foreign Application Priority Data
Dec. 27, 2002 (JP) .............................. 2002-379504
Apr. 25, 2003 (JP) .............................. 2003-122250

(51) Int. Cl.
*A63D 9/00* (2006.01)

(52) U.S. Cl. ........................ 473/119; 264/275; 264/509

(58) Field of Classification Search ................ 473/118, 473/119, 120, 121, 124; 264/275, 328.8, 264/509
See application file for complete search history.

(56) References Cited

U.S. PATENT DOCUMENTS

| | | | | |
|---|---|---|---|---|
| 3,044,777 A | * | 7/1962 | Friedman | 473/119 |
| 3,092,386 A | * | 6/1963 | Dettman | 473/119 |
| 3,228,687 A | * | 1/1966 | Bauer | 473/121 |
| 3,231,274 A | * | 1/1966 | Wanders | 473/119 |
| 3,346,258 A | * | 10/1967 | Schimanski et al. | 473/121 |
| 3,445,113 A | * | 5/1969 | Satchell et al. | 473/121 |
| 3,474,498 A | * | 10/1969 | Hoppes | 425/190 |
| 3,879,876 A | * | 4/1975 | Morgan | 40/327 |
| 6,790,401 B1 | * | 9/2004 | Yasuo | 264/275 |
| 2003/0109317 A1 | * | 6/2003 | Yasuo | 473/119 |

FOREIGN PATENT DOCUMENTS

| | | |
|---|---|---|
| JP | 06-77781 U | 11/1994 |
| JP | 2002-205316 | 7/2002 |

* cited by examiner

*Primary Examiner*—William M. Pierce
(74) *Attorney, Agent, or Firm*—Browdy and Neimark, PLLC

(57) ABSTRACT

The present invention provides a bowling pin which exhibits the excellent durability while satisfying conditions required on the bowling pin such as a weight and a dry sound which is generated at the time of hitting. A hollow portion which extends in the vertical direction is formed in a core material which constitutes a bowling pin. Upper and lower end portions of the hollow portion are opened, wherein one cap is fitted into an opening and another cap is fitted into a lower-side opening. The whole of the core material and the cap are almost covered with a surface skin portion and a portion of the core material where the surface skin portion is not provided is formed of two line portions and a dial portion. The surface skin portion is white, the line portions are red and the dial portion is black.

12 Claims, 13 Drawing Sheets

Fig.18
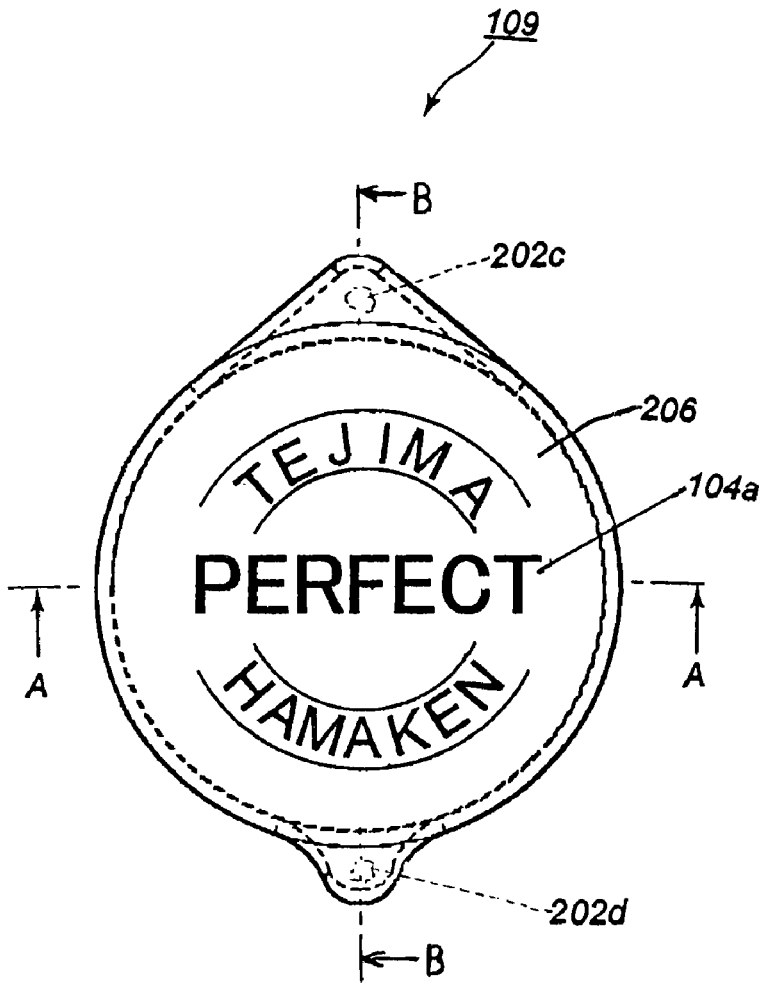
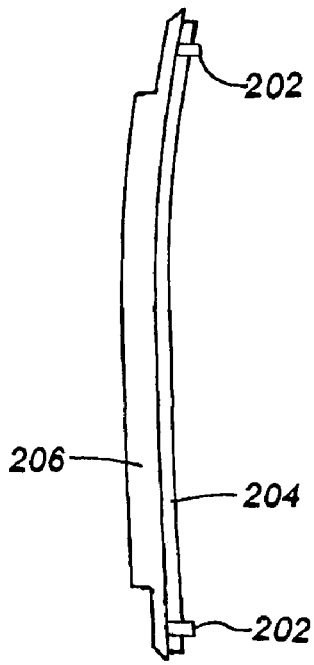
Fig.20
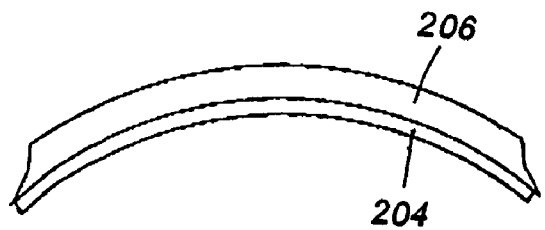
Fig.19

BOWLING PIN AND MANUFACTURING METHOD OF THE SAME

BACKGROUND OF THE INVENTION

1. Field of the Invention

The present invention relates to a bowling pin and a manufacturing method of the same.

2. Description of the Related Art

The bowling is popularly enjoyed as a simple leisure and the bowling is also performed popularly in competitions.

With respect to a pin which is served for bowling, the property that the pin can be easily turned down when a ball hits the pin or other pin hits the pin is important. That is, provided that conditions such as an impact force, an impact angle and the like at the time of hitting are equal among pins, the pins must be uniformly turned down. Accordingly, in conformity with the international standard, the shape and the weight of the pin is strictly determined such that a height is 38 cm, a maximum diameter is 12 cm, a diameter of a bottom face is 6 cm, a weight is not less than 1417 g and not more than 1644 g, and the difference in weight among ten pins which are arranged on each lane is less than 113 g.

The bowling pin is also required to generate a dry sound peculiar to the pin which is generated when the ball hits the pin or the pins hit each other and to have durability which can withstand the repeated hitting. Accordingly, the bowling pin which covers a surface of a wooden core material with a synthetic resin layer has been used.

Further, on a surface of this wooden bowling pin, a display portion constituted of letters, patterns and the like is formed by baking.

The weight of the ball is approximately 7.52 kg at maximum and velocity attributed to throwing the ball is also added to the ball when the ball hits the pin and hence, the energy of the ball is extremely large. Accordingly, depending on the use frequency of the pins, the pins must be exchanged with new pins at an interval of about several months and hence, the period in which the pin can be used is relatively short under such circumstances.

Accordingly, as the core material of the bowling pin, use of a synthetic resin having the excellent durability is considered. However, the use of such a synthetic resin has several drawbacks. First of all, since the synthetic resin has a larger specific weight than wood and hence, when the bowling pin is manufactured in a prescribed shape, the weight of the bowling pin becomes excessively heavy. The second drawback is that the dry sound which is peculiar to the pins is not generated when the ball and the pin hit each other or the pins hit to each other.

Accordingly, there has been proposed an idea which is considered to solve the above-mentioned drawback by making the core material manufactured using the synthetic resin in a hollow shape. However, when a hard synthetic resin is applied to the surface of the core material manufactured in a hollow shape by insert molding, the core material cannot withstand high temperature and high pressure and is deformed whereby they cannot be used as products.

Further, when the ball hits the pin, when the bowling pins hit each other, or when the turned-down pins are reset, the display portion formed on the surface of the bowling pin receives a considerable impact and friction. Since the display portion constituted of letter, patterns and the like is formed by baking, the display portion is peeled off in a short period thus exhibiting the poor appearance. Accordingly, it is necessary to paint the bowling pin again or the bowling pins must be frequently exchanged with new bowling pins.

The present invention has been made in view of the above-mentioned drawbacks and it is an object of the present invention to provide a bowling pin which exhibits the excellent durability while satisfying conditions such as a shape and a weight which the bowling pin is required to satisfy, a dry sound which is generated at the time of hitting and the like and a manufacturing method thereof.

Further, it is an object of the present invention to provide a bowling pin which exhibits high durability by preventing peeling off of a display portion even when the display portion receives an impact or a friction and a manufacturing method thereof.

SUMMARY OF THE INVENTION

To achieve this object, the present invention is directed to a bowling pin which is characterized by including a core material having a hollow portion made of synthetic resin, the hollow portion having opening portions, a surface skin portion made of hard synthetic resin which is molded on a surface of the core material, and a cap fitted in the opening portion.

According to this bowling pin, it is possible to generate a dry sound when the ball hits the bowling pins or the bowling pins hit each other in the same manner as a conventional bowling pin having the wooden core material and, at the same time, the bawling pins satisfy stipulated shapes and weights.

The bowling pin according to the present invention which has the above-mentioned constitution is also characterized by following constitutions.

(1) A recessed portion is formed in the surface skin portion and a display body which displays letters and a pattern or the like and is formed of synthetic resin is formed in the recessed portion.

(2) The synthetic resin which forms the display body has resiliency.

(3) The bowling pin includes a base portion, a display body which is provided to the base and displays letters, a pattern or the like, and a transparent portion which covers the display body and through which the letters, the pattern or the like of the display body can be observed, and a display part which is constituted of a cover connected to the base is embedded in the surface skin portion in a state that a portion of the display portion is exposed.

(4) Th base and the cover are formed into the structure in which the base and the cover are fitted to each other.

(5) A synthetic resin which constitutes the cover has flexibility which is higher than flexibility of a synthetic resin which constitutes the base of the display body.

(6) The display body has an exposure portion which is exposed from the surface skin portion and an embedded portion which is arranged around an outer periphery of the exposed portion and is embedded in the surface skin portion which is formed lower than the exposed portion by one step.

(7) At least one surface of the base on which the display body is arranged is colored.

To achieve the above-mentioned object of the present invention, the present invention is also directed to a method of manufacturing a bowling pin which is characterized in that a hollow core material having opening portions is formed by injection molding, a deformation preventing material is fitted into the inside of the hollow portion through the opening portion of the core material, the core material is set in a mold, and a surface skin portion made of a synthetic resin is formed on the core material by molding.

The method of manufacturing a bowling pin which has the above-mentioned constitution is also characterized by following constitutions.

(8) A projected display body is formed on a surface of the core material using a synthetic resin before forming the surface skin portion by molding, and the surface skin portion is formed such that the display body is exposed.

(9) A recessed portion is formed on the surface skin portion and the display body is formed in the inside of the recessed portion using synthetic resin.

(10) A cap which plugs the opening portion is used as the deformation preventing material.

BRIEF DESCRIPTION OF THE DRAWINGS

FIG. 18 is a front view showing a modification of the display portion;

FIG. 19 is a cross-sectional view taken along a line A—A in FIG. 18; and

FIG. 20 is a cross-sectional view taken along a line B—B in FIG. 18.

PREFERRED EMBODIMENTS OF THE PRESENT INVENTION

A bowling pin 1 and a manufacturing method thereof according to a first embodiment of the present invention are explained in conjunction with FIG. 1 to FIG. 7.

Figure 1:
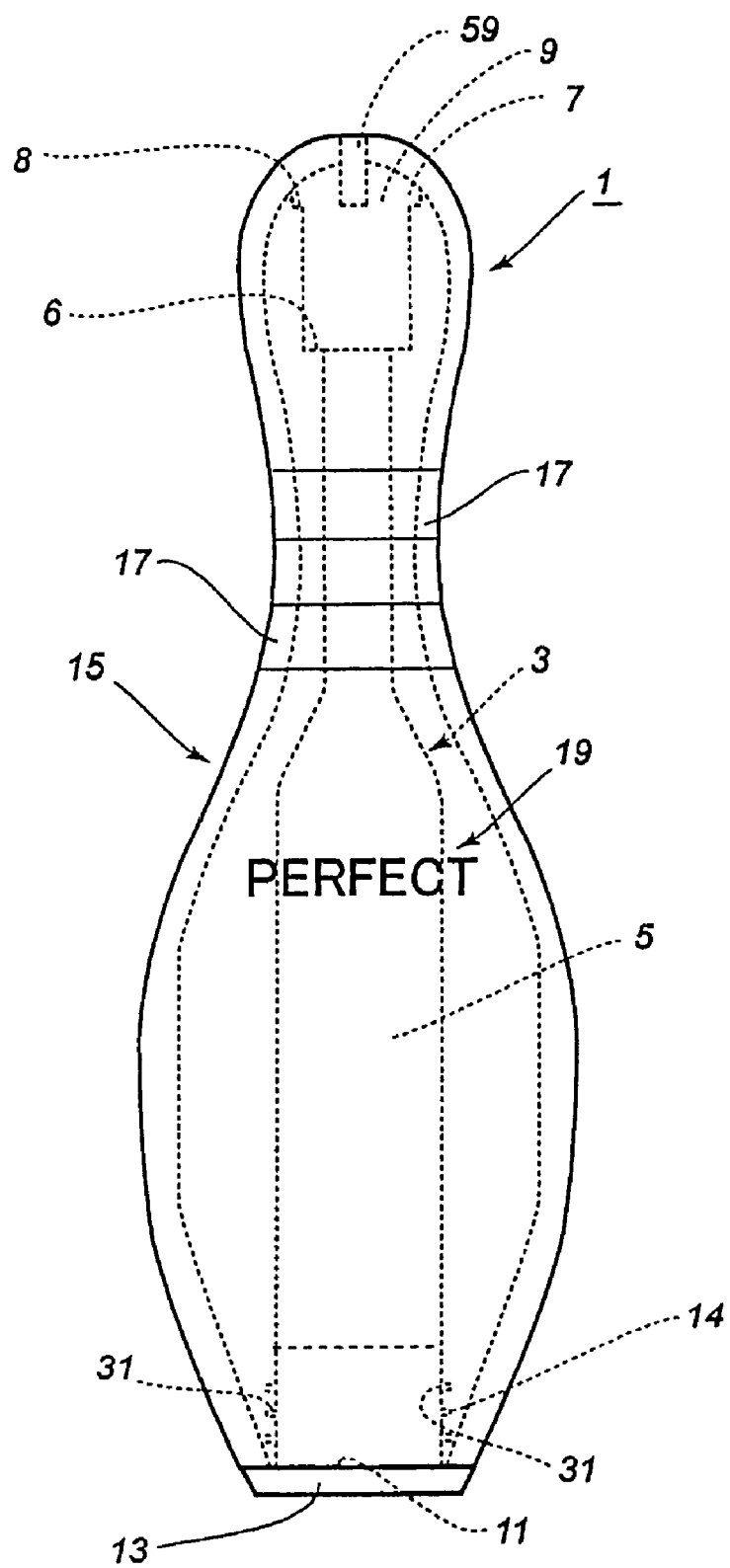
FIG. 1 is a front view of a bowling pin according to the first embodiment of the present invention.

The constitution of the bowling pin 1 is explained in conjunction with FIG. 1.

Numeral 3 indicates a core material and a hollow portion 5 which extends in the vertical direction is formed in the core material 3. Upper and lower end portions of the hollow portion 5 are opened, wherein a cap 9 which constitutes a deformation prevention material is fitted into an upper-side opening and a cap 13 is fitted into a lower-side opening 11. The whole of the core material 3 and the cap 9 is almost covered with a surface skin portion 15. At a portion where the surface skin portion 15 is not present, two line portions 17 and a dial portion 19 which constitute a display member are exposed from the surface skin portion 15. The surface skin portion 15 is white, the line portions 17 are red and the dial portion 19 is black.

With respect to a material of the core material 3, a type of synthetic resin is not specifically limited and reproduced pellets or the like can be used. The reproduced pellets which have the following composition, for example, can be used.

| Admer (trademark) | 9 to 15% |
|---|---|
| 6 nylon (trademark) | 0 to 46% |
| 666 nylon (trademark) | 0 to 33% |
| 12 nylon (trademark) | 0 to 8% |
| EVOH resin | 0 to 21% |
| EVAR (trademark) | 0 to 39% |
| PE | 0 to 53% |
| PP | 0 to 45% |

The surface skin portion 15 and the line portions 17 are formed of nylon-based resin, for example, and the dial portion 19 is formed of urethane-based resin.

Next, the manufacturing method of the bowling pin 1 according to the present invention is explained.

Figure 2:
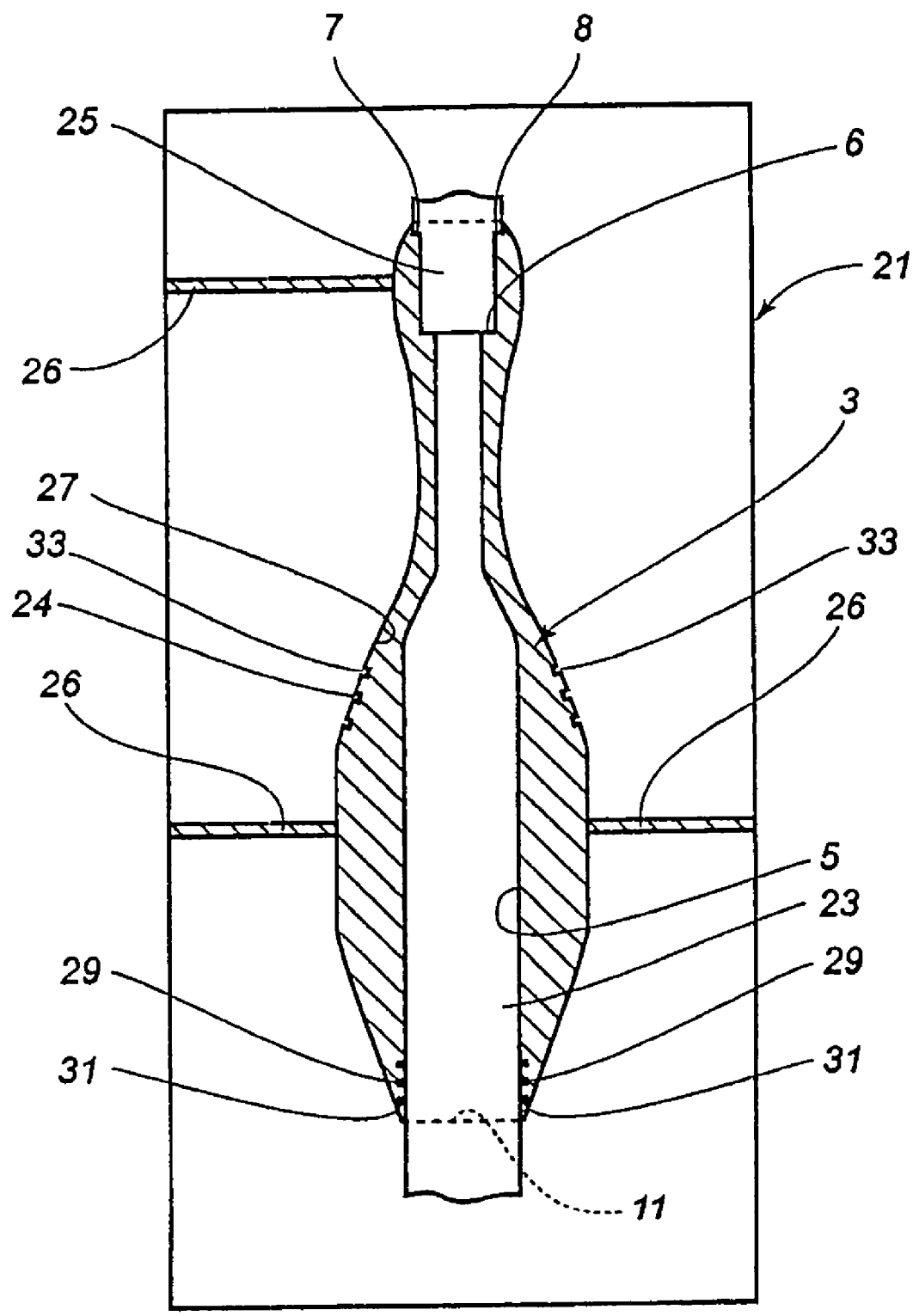
FIG. 2 is a view for explaining a manufacturing step of the bowling pin according to the first embodiment of the present invention.

First of all, the core material 3 is manufactured in advance. That is, as shown in FIG. 2, cores 23, 25 which are capable of forming the hollow portion 5 are set in a mold 21 and synthetic resin is injected into a cavity 27 through gates 26 so as to form the core material 3 by molding.

The core 25 is formed such that the core 25 has a diameter size larger than a diameter size of an upper end portion of the core 23. Further, the diameter size of the core 25 is increased from a midst portion thereof and hence, stepped portions 6, 8 are formed in the hollow portion 5 of the core material 3. The stepped portion 6 is formed at the midst portion of an upper end portion of the hollow portion 5, while the stepped portion 8 is formed in the vicinity of the upper-side opening 7 (see FIG. 3).

Further, annular projections 29 are formed on an outer peripheral surface of a proximal portion of the core 23 and hence, annular grooves 31 are formed in an inner peripheral face of the lower end portion of the hollow portion 5. Further, projections 24 which project into the cavity 27 are formed on the mold 21 and hence, small cavities 33 are formed in the outer peripheral surface of the core material 3 (see FIG. 3).

Figure 3:
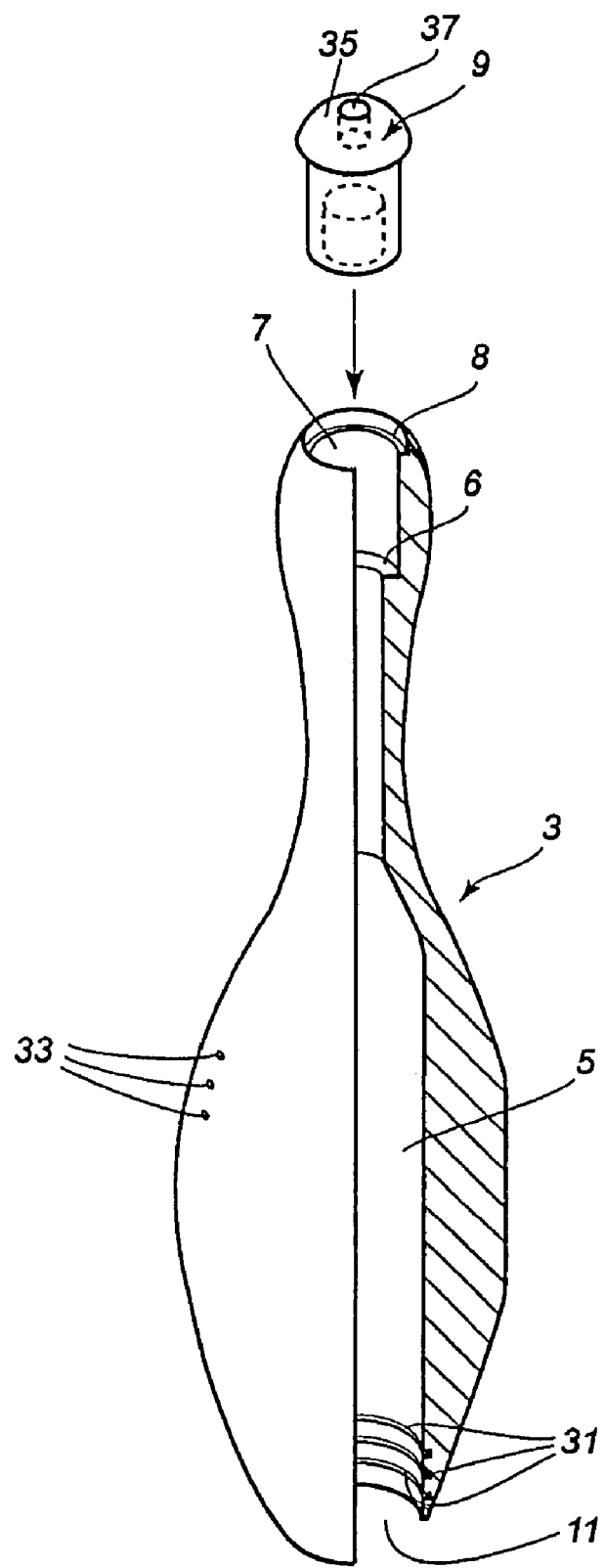
FIG. 3 is a perspective view with a part broken away of a core material constituting the bowling pin shown in FIG. 1.

Next, the core material 3 is taken out from the mold 21 and the cap 9 is fitted into the hollow portion 5 from the upper-side opening 7 of the core material 3 by hitting as shown in FIG. 3. The cap 9 includes a head 35 and a circular hole 37 is formed at the center of the head 35.

Figure 4:
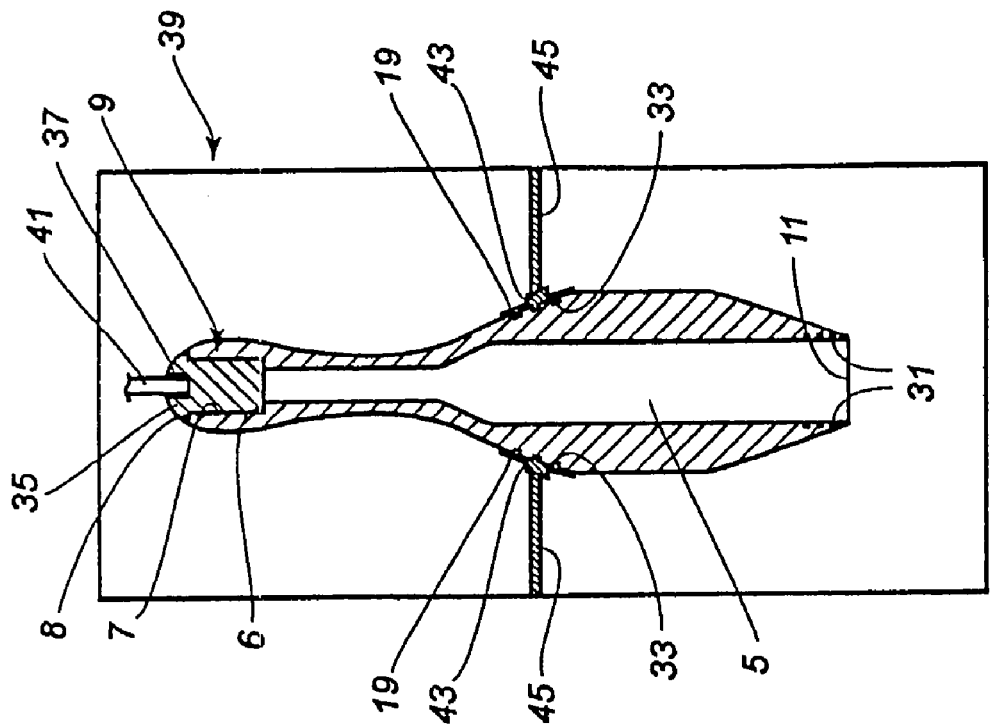
FIG. 4 is a view for explaining a manufacturing step of the bowling pin according to the first embodiment of the present invention.

As shown in FIG. 4, the core material 3 into which the cap 9 is fitted by hitting is set in a mold 39 and an iron rod 41 is inserted into the circular hole 37 of the cap 9 so as to fix the core material 3. Since the core material 3 is fixed by the iron rod 41, it is possible to surely control the height size of the bowling pin 1.

Cavities 43 for forming the dial portion 19 are formed in the mold 39. By injecting urethane-based resin in the cavities 43 through gates 45, the dial portion 19 is formed. Since the resin for forming the dial portion 19 flows into the small cavity 33 of the core material 3, the dial portion 19 is surely fixed to the core material 3.

Figure 5:
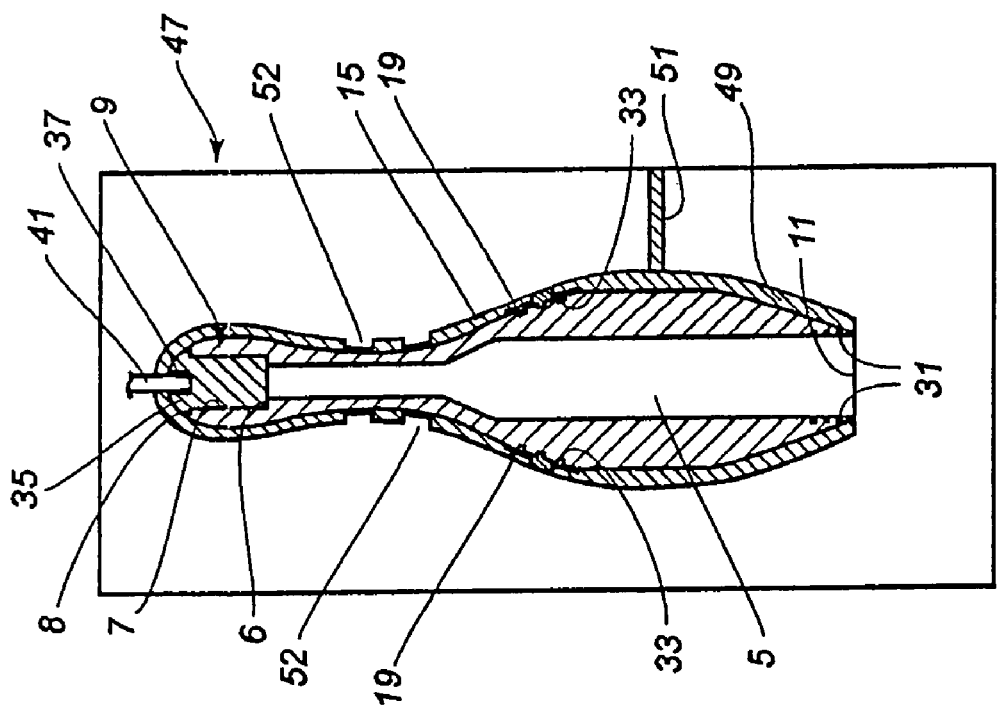
FIG. 5 is a view for explaining a manufacturing step of the bowling pin according to the first embodiment of the present invention.

The core material 3 on which the projecting dial portion 19 is formed in the above-mentioned manner is set in a mold 47 as shown in FIG. 5 and the iron rod 41 is fitted into the circular hole 37 of the cap 9 so as to fix the core material 3. A cavity 49 for forming the surface skin portion 15 is formed in the mold 47 and nylon-based resin is injected into the cavity 49 through a gate 51 so as to form the surface skin portion 15. The cap 9 is covered with the surface skin portion 15 and a recessed portion 52 where the surface skin portion 15 is thin is formed at a neck portion of the core material 3.

When nylon-based resin is used as the material of the surface skin portion 15, the nylon-based resin is heated up to a temperature of equal to or more than 250° C. and, at the same time, the inside of the cavity 49 is pressurized. However, since the cap 9 is fitted into the upper end portion of the hollow portion 5, it is possible to surely manufacture the core material 3 into a given shape prescribed by the international standard without generating the deformation of the core material 3.

The dial portion 19 is exposed. When the surface skin portion 15 is formed, pressure is applied to the dial portion 19. Since the dial portion 19 is formed of the urethane-based resin having resiliency as mentioned previously, the dial portion 19 is compressed and the density thereof is increased whereby the dial portion 19 can be clearly observed with naked eyes. Further, although a dial portion formed by painting is erased by wear, there is no such possibility with respect to the dial portion 19.

Figure 6:
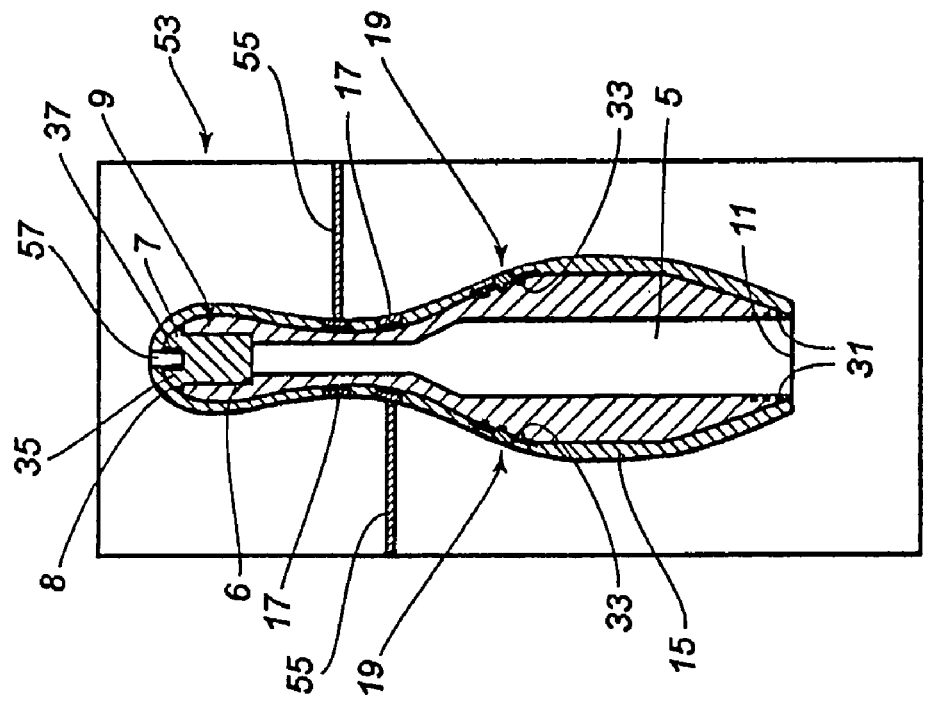
FIG. 6 is a view for explaining a manufacturing step of the bowling pin according to the first embodiment of the present invention.
Figure 7:
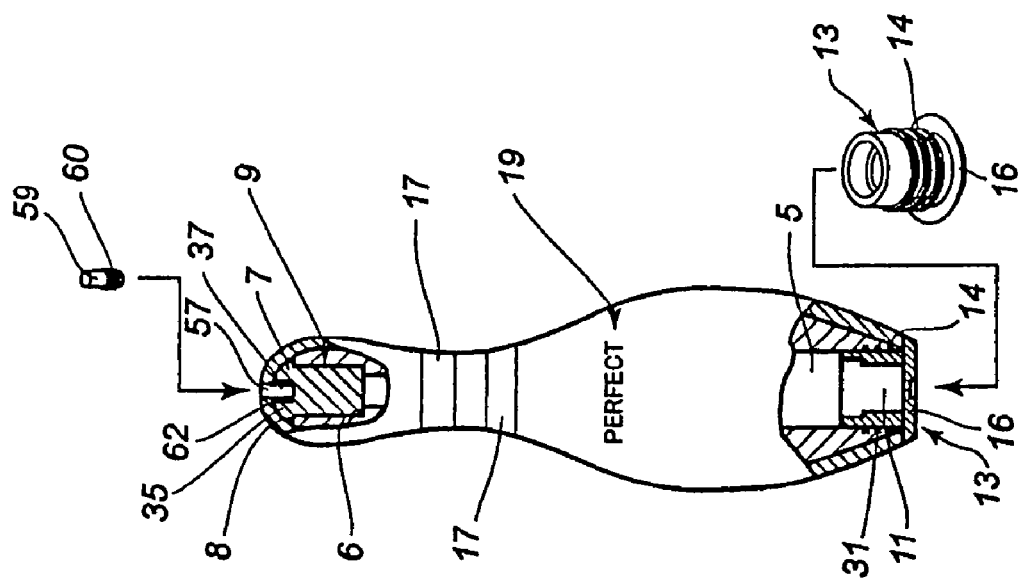
FIG. 7 is a view for explaining a manufacturing step of the bowling pin according to the first embodiment of the present invention.

Next, the core material 3 on which the surface skin portion 15 is formed is set in a mold 53 as shown in FIG. 6, red nylon resin is injected into a recessed portion 52 through a gate 55 thus forming two line portions 17 by so-called two color molding. Since the line portions 17 are formed by the synthetic resin which is filled in the recessed portion 52, although line portions which are formed by coating may be erased by wear, there is no such possibility with respect to the line portions 17.

The core material 3 on which the skin portion 15, the line portions 17 and the like are formed in the above-mentioned manner is taken out from the mold 53, a cap 59 is inserted into a hole 57 which is formed after removing the iron rod 41 and, thereafter, the cap 59 is inserted into the circular hole 37 of the cap 9 by hitting. By having a projection 60 formed on an outer peripheral surface of the cap 59 fitted into a recessed portion 62 formed in an inner peripheral surface of the circular hole 37, the removal of the cap 59 is prevented.

Further, the cap 13 is fitted into the lower-side opening 11 by hitting, a projection 14 of the cap 13 is fitted into the annular groove 31 formed in the inner peripheral surface of the hollow portion 5 so that the removal of the cap 13 can be prevented. The head 16 of the cap 13 assumes a state in which the head 16 is brought into contact with a lower face of the core material 3.

The bowling pin 1 is completed in this manner.

A bowling pin 101 and a manufacturing method thereof according to the second embodiment of the present invention are explained in conjunction with FIG. 8 to FIG. 17.

Here, the bowling pin 101 according to this embodiment includes constitutional parts which are similar to the constitutional parts of the bowling pin 1 according to the first embodiment and hence, by giving symbols which are identical with the symbols used in the explanation of the first embodiment are given to these constitutional parts, their explanation is omitted.

Figure 8:
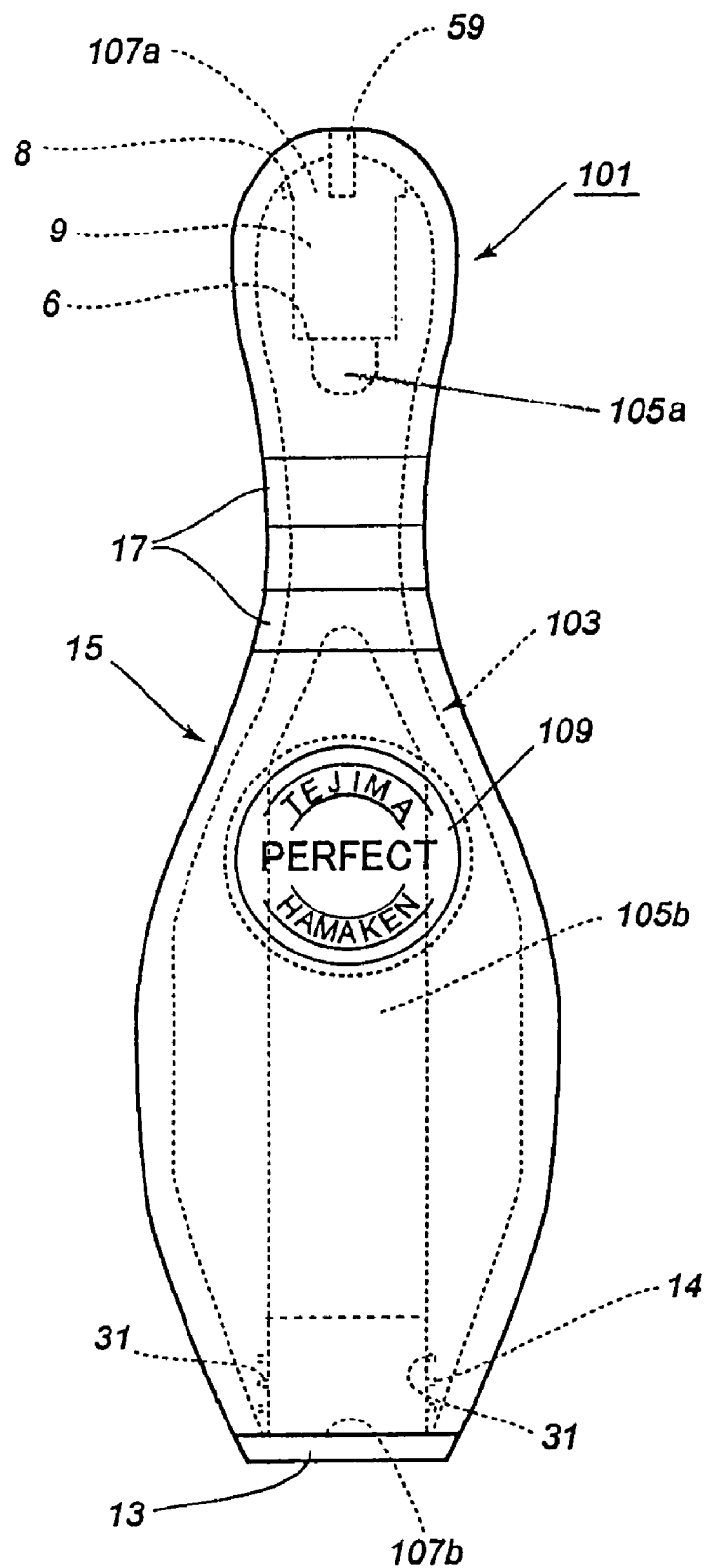
FIG. 8 is a front view of a bowling pin according to the second embodiment of the present invention.
Figure 9:
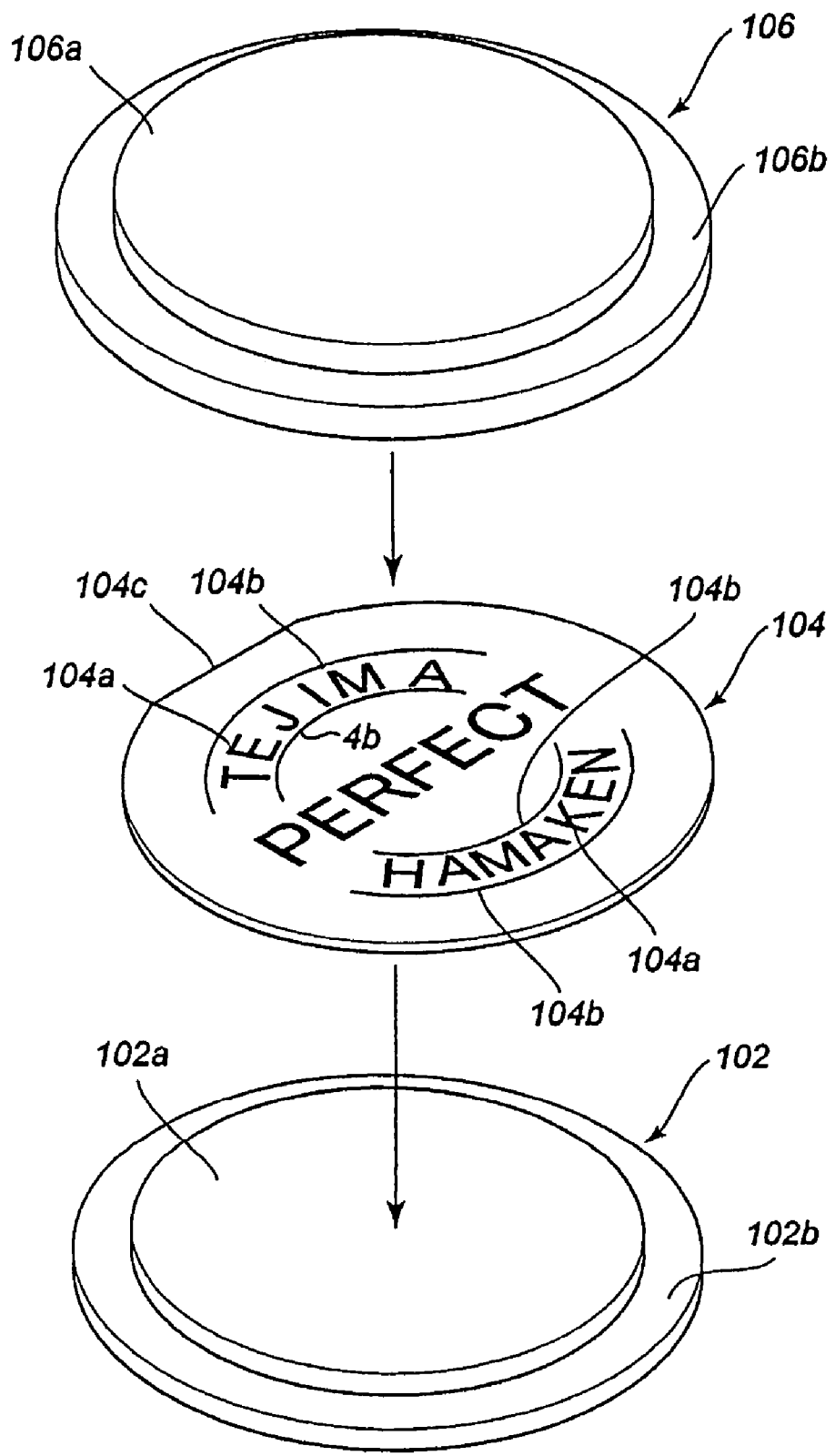
FIG. 9 is an exploded perspective view of a display portion provided to the bowling pin according to the second embodiment of the present invention.

The constitution of the bowling pint 101 is explained in conjunction with FIG. 8.

Numeral 103 indicates a core material and an upper-side hole 105 a and a lower-side hole 105b which constitute a hollow portion is formed in the core material 103. Synthetic resin which constitutes the core material 103 is interposed between the upper-side hole 105a and the lower-side hole 105b, while the upper-side hole 105a and the lower-side hole 105b have bottoms respectively. The upper-side hole 105a has an upper side opening 107a at an upper end of the core material 103 and the lower-side hole 105b has a lower-side opening 107b at a lower end of the core material 103. A cap 9 which constitutes a deformation prevention material is fitted into the upper-side opening 107a, while a cap 13 is fitted into the lower-side opening 107b. The whole of the core material 103 and the cap 9 is almost covered with a surface skin portion 15. At a portion where the surface skin portion 15 is not present, two line portions 17 and a display portion 109 are formed such that they are exposed from the surface skin portion 15. The surface skin portion 15 is white and the line portions 17 are red. The surface skin portion 15 and the line portions 17 are formed of nylon-based resin, for example.

The constitution of the display portion 109 is explained, the display portion 109 is constituted of a base 102 which is formed of blue urethane-based resin, a display body 104 which is made of transparent nylon (trademark)-based resin and a cover 106 which is formed of transparent urethane-based resin. The base 102 has flexibility which is slightly higher than flexibility of the cover 106.

Figure 10:
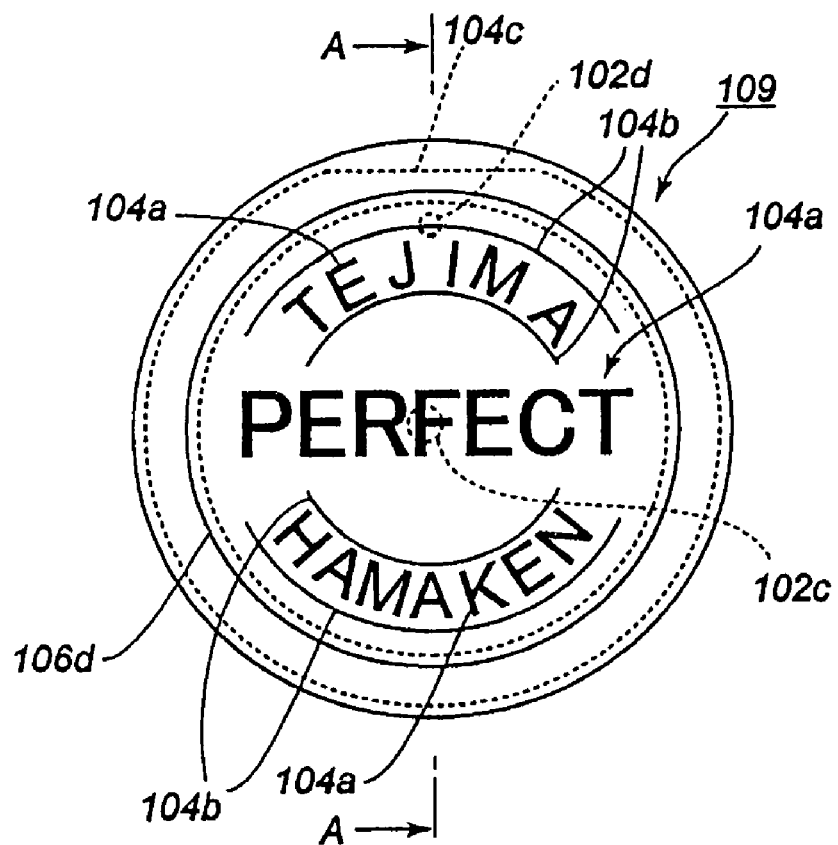
FIG. 10 is a front view of a display portion provided to the bowling pin according to the second embodiment of the present invention.
Figure 11:
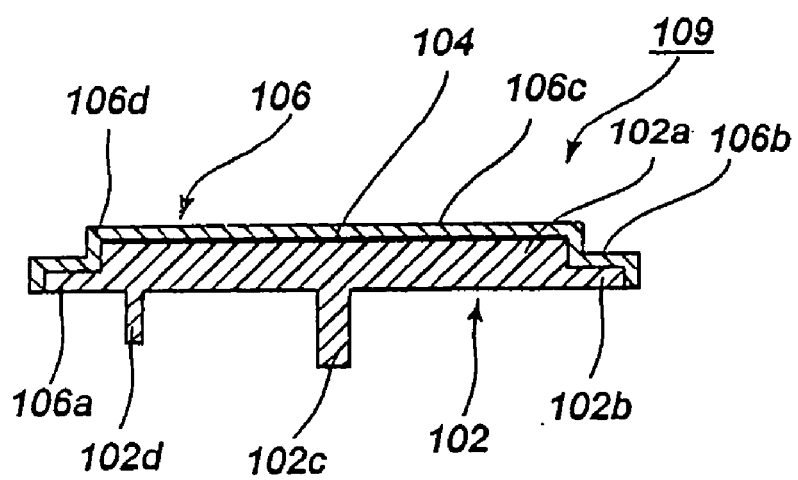
FIG. 11 is a cross-sectional view taken along a line A—A in FIG. 10.

The base 102 has a disc portion 102a and a flange 102b which is formed at a lower end of an outer peripheral portion of the disc portion 102a. As shown in FIG. 10 and FIG. 11, columnar bosses 102c, 102d are formed on a back surface of the disc portion 102a, wherein the boss 102c is arranged at the center of the disc portion 102a and the boss 102d is arranged at a position close to the vicinity of an outer peripheral portion. The boss 102c is longer than the boss 102d and also has a diameter size which is larger than a diameter size of the boss 102d.

On a front surface of the thin and substantially disc-like display body 104, a red character 104a and a yellow pattern 104b are printed. In this manner, the display body 104 can display the characters 104 or the like by printing and hence, it is possible to readily apply vivid colors to the display body 104. Further, an upper end portion of the display body 104 is configured such that a portion of an arc is removed and a straight portion 104c is formed on this removed portion.

A recessed portion 106a is formed on a back surface of the cover 106 and the recessed portion 106a is constituted of two stepped portions. The recessed portion 106a is formed in a shape which allows the recessed portion 106a to be snugly fitted on an upper surface of the base 102, while a disc portion 106c and a flange 106b are formed corresponding to the recessed portion 106a.

The display portion 109 is configured such that the display body 104 is mounted on the disc portion 102a of the base 102, the cover is formed over the display body 104, and the recessed portion 106a of the cover 106 is fitted over the upper surface of the base 102. The display body 104 is mounted on the disc portion 102a at the accurate position in view of the relative position of the display body 104 with respect to the straight portion 104c, the boss 102c and the boss 102d. Since the base 102 has flexibility which is slightly higher than flexibility of the cover 106 as mentioned above, the cover 106 is fitted over the base 102 such that the base 102 is slightly shrunken by compression. Accordingly, the cover 106 is fitted over the base 102 such that the cover 106 cannot be removed from the base 102 easily.

Next, the manufacturing method of the bowling pin 101 is explained.

Figure 12:
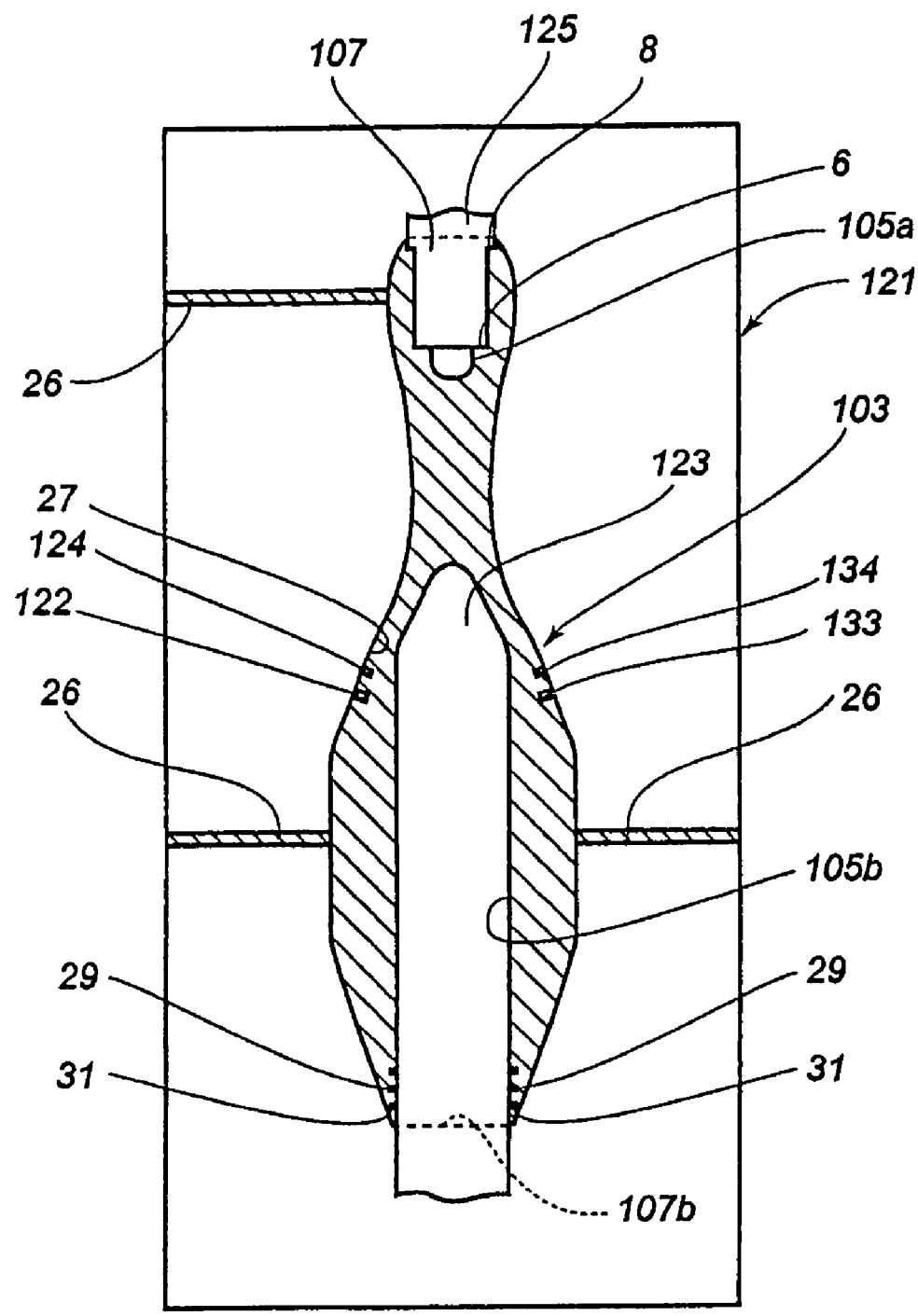
FIG. 12 is a view for explaining a manufacturing step of the bowling pin according to the second embodiment of the present invention.

First of all, the core material 103 is preliminarily manufactured. That is, as shown in FIG. 12, cores 123, 125 which are capable of forming the upper-side hole 105a and the lower-side hole 105b are set in a mold 121 and synthetic resin is injected into a cavity 27 through gates 26 so as to form the core material 103 by molding.

By setting the core 125, stepped portions 6, 8 are formed at intermediate portions of the upper-side hole 105a of the core material 103. The stepped portion 6 is formed in the vicinity of a bottom of the upper-side hole 105a and the stepped portion 8 is formed in the vicinity of an upper-side opening 107a (see FIG. 12).

Further, annular projections 29 are formed in an outer periphery of a proximal end portion of the core 123 and hence, annular grooves 31 are formed on an inner peripheral surface of a lower end portion of the lower-side hole 105b. Further, projecting projections 122, 124 which project into the cavity 27 are formed on the mold 121 and hence, small holes 133, 134 are formed in an outer peripheral surface of the core material 103 (see FIG. 13). The small holes 133, 134 correspond to projections 120c, 120d of a display portion 109, wherein a diameter size of the small hole 133 is set larger than a diameter size of the small hole 134.

Figure 13:
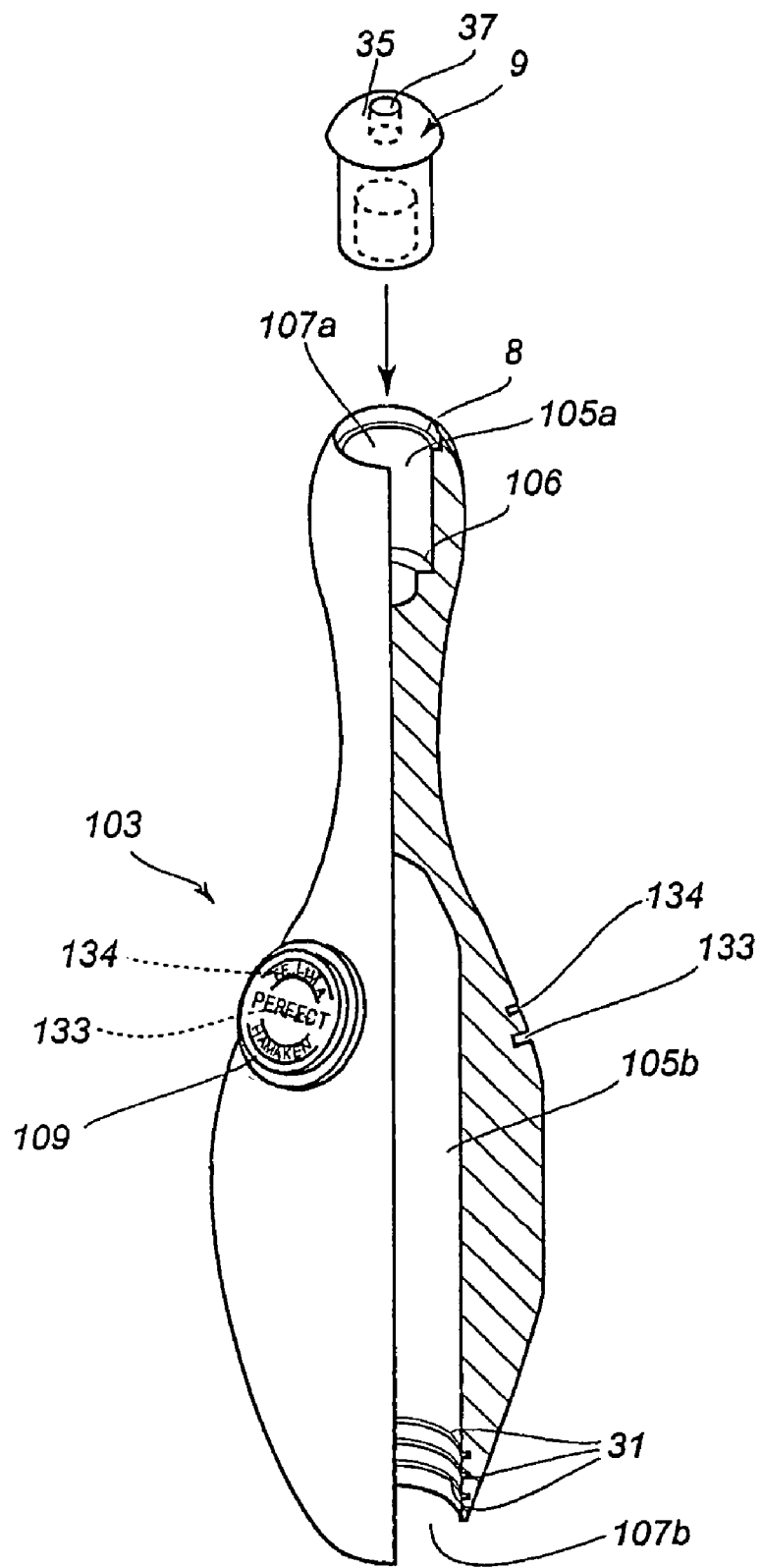
FIG. 13 is a perspective view with a part broken away of a core material which constitutes the bowling pin shown in FIG. 8.

Next, the core material 103 is taken out from the mold 121 and the cap 9 is inserted into the upper-side hole 105a through the upper-side opening 107a of the core material 103 by hitting as shown in FIG. 13. Further, the bosses 102c, 102d of the display portion 109 are respectively fitted into the small holes 133, 134 so as to fix the display portion 109 to the core material 103. Since the boss 102c and the boss 102d differ in length and diameter size from each other as mentioned above, the boss 102c cannot be fitted into the small hole 134. Accordingly, the display portion 109 is always mounted on the core material 103 with a correct posture.

Figure 14:
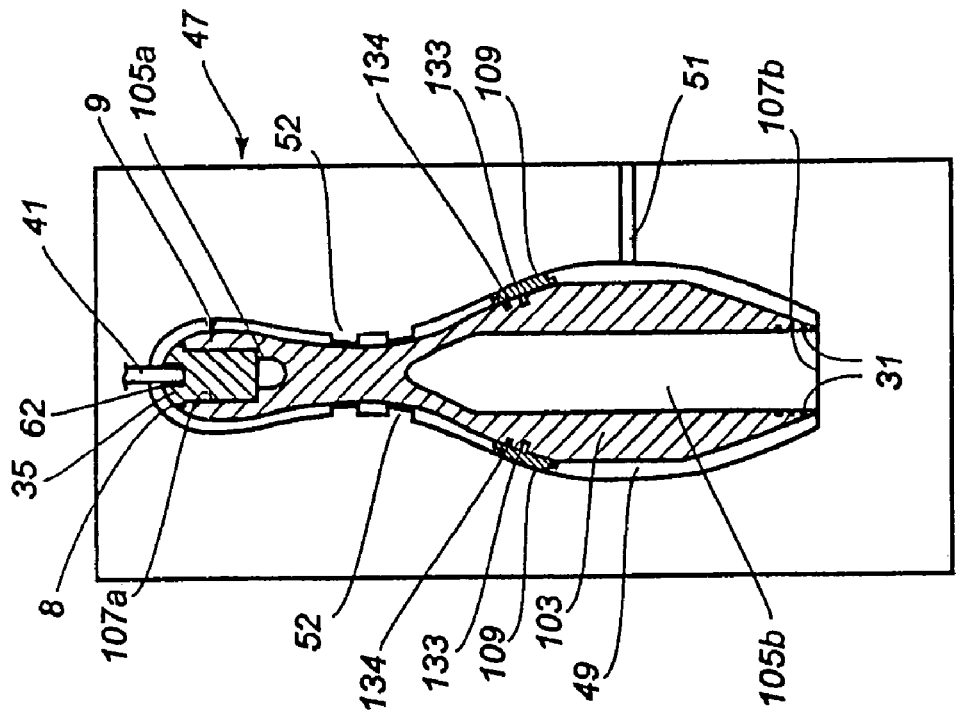
FIG. 14 is a view for explaining a manufacturing step of the bowling pin according to the second embodiment of the present invention.
Figure 15:
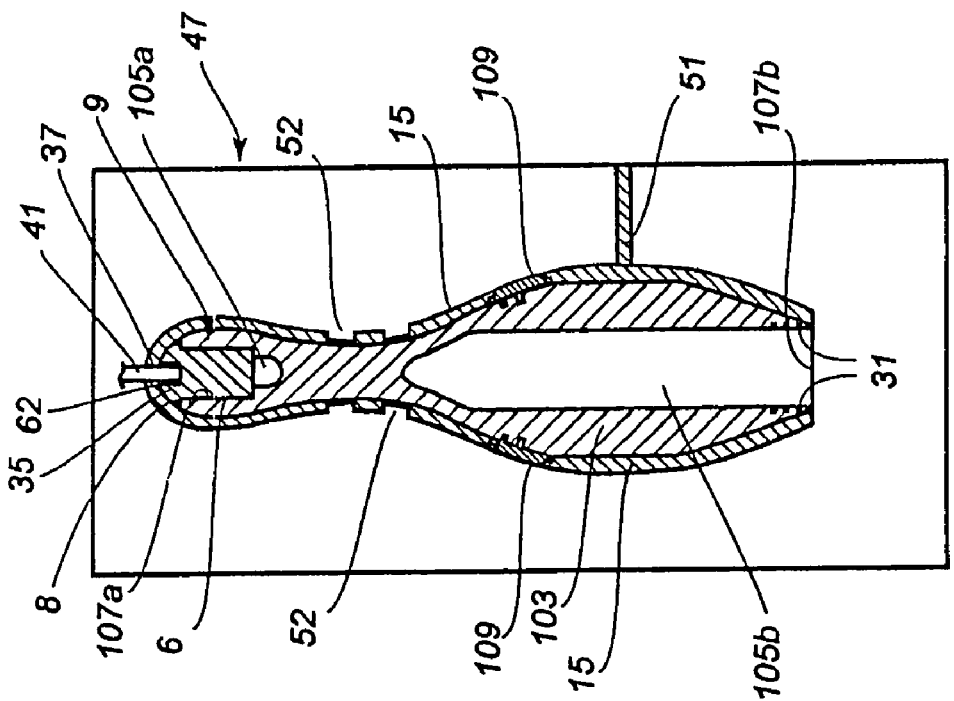
FIG. 15 is a view for explaining a manufacturing step of the bowling pin according to the second embodiment of the present invention.

The core material 103 in which the cap 9 is inserted by hitting and to which the display portion 109 is fixed as shown in FIG. 14 is set in a mold 47 and an iron rod 41 is inserted into a circular hole 37 of the cap 9 to fix the core material 103. By fixing the core material 103 using the iron rod 41, the height dimension of the bowling pin 101 can be surely controlled.

A cavity 49 for forming the surface skin portion 105 is formed in the mold 47. By injecting nylon-based resin into the cavity 49 through a gate 51, a surface skin portion 15 is formed (see FIG. 15). The cap 9 is covered with the surface skin portion 15 and recessed portions 52 where the surface skin portion 15 is thin are formed in a neck portion of the core material 103 at two positions.

When nylon-based resin is used as the material of the surface skin portion 15, the nylon-based resin is heated up to a high temperature of equal to or more than 250° C. and, at the same time, the inside of the cavity 49 is pressurized. However, since the cap 9 is fitted into the upper-side hole 105a, it is possible to surely manufacture the core material 103 having a given shape which is stipulated by the international standard without generating the deformation of the core material 103.

When the surface skin portion 15 is formed, with respect to the display portion 109, a flange 106b is covered with the surface skin portion 15 and only the disc portion 106c is exposed. The base 102 and the cover 106 of the display portion 109 are formed of the urethane-based resin having resiliency as mentioned previously and hence, the display portion 109 is curved along a curved face of the surface skin portion 105. Further, only the flange 106b of the display portion 109 is covered with the surface skin portion 105 and hence, the blue base 102 is observed through a periphery 106d of the transparent disk portion 106c. Accordingly, in viewing the display portion 109 from a front side, a blue ring is observed at the periphery 106d.

The display body 104 of the display portion 109 is covered with the cover 106 as mentioned previously and hence, different from a display portion which is formed by painting, there is no possibility that the display is erased by wear.

Figure 16:
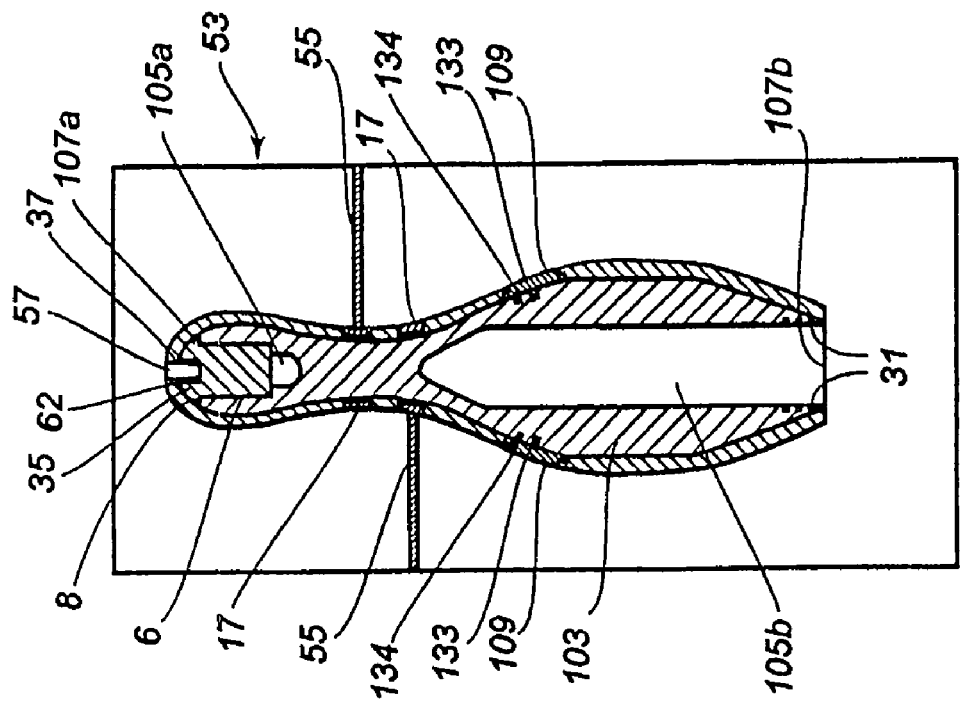
FIG. 16 is a view for explaining a manufacturing step of the bowling pin according to the second embodiment of the present invention.
Figure 17:
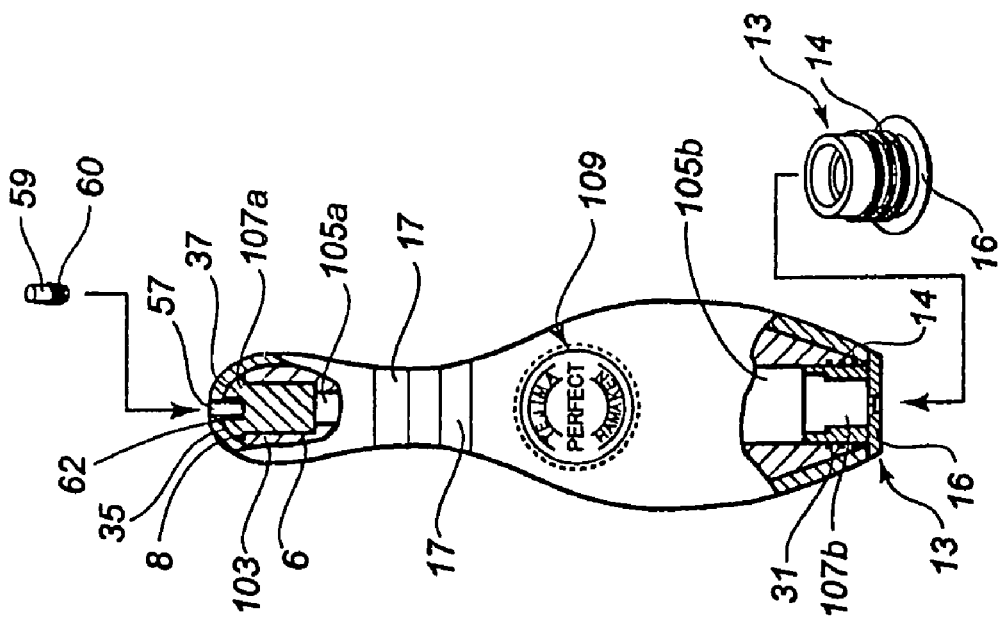
FIG. 17 is a view for explaining a manufacturing step of the bowling pin according to the second embodiment of the present invention.

Next, the core material 103 on which the surface skin portion 15 is formed is set in a mold 53 as shown in FIG. 16 and red nylon resin is injected into recessed portions 52 through gates 55 thus forming two line portions 17 by so-called two color molding. Since these line portions 17 are formed of synthetic resin filled in the recessed portion 52, different from line portions which are formed by painting, there is no possibility that the line portions 17 are erased by wear.

The core material 103 on which the surface skin portion 15, the line portion 17 and the like are formed in the above-mentioned manner is taken out from the mold 53. A cap 59 is inserted into a hole 57 which is formed after removing the iron rod 41 and is further inserted into a circular hole 37 formed in the cap 9 by hitting (see FIG. 17). By fitting a projection 60 formed on an outer peripheral surface of the cap 59 into a recessed portion 62 formed in an inner peripheral surface of the circular hole 37, it is possible to prevent the removal of the cap 59.

Further, the cap 13 is inserted into a lower-side opening 107b by hitting and the projection of the cap 13 is fitted into the recessed groove 31 formed in the inner peripheral surface of the lower-side hole 105b and hence, the removal of the cap 13 is prevented. A head 16 of the cap 13 assumes a state in which the head 16 is brought into contact with a lower surface of the core material 103.

In this manner, the bowling pin 101 is completed.

Although the embodiments of the present invention have been explained in detail heretofore, the specific constitutions are not limited to the constitutions of these embodiments and any design changes which do not depart from the gist of the present invention are included in the present invention.

For example, although the base 102 and the cover 106 are formed of the urethane-based resin in the second embodiment, the present invention is not limited to this material and the base 102 and the cover 106 may be formed of other synthetic resin. Further, the display body 104 may be also constituted of other synthetic resin, paper or the like besides the nylon-based resin.

Further, the display portion 109 may be formed as shown in FIG. 18 to FIG. 20.

That is, as shown in these drawings, the display portion 109 may be constituted of a curved transparent plate 206, a display body 204 laminated to a back side of the transparent plate 206 and bosses 202*c*, 202*d*.

The transparent plate 206 is formed such that the transparent plate 206 is bent or curved in the circumferential direction of the bowling pin. The display body 204 on which characters or a pattern are printed is laminated to a back side of the transparent plate 206 by way of a transparent adhesive agent.

As a material which forms the transparent plate 206, a transparent resin such as polycarbonate can be named.

As a material which forms the display body 204 on which the characters or the pattern are printed, a plastic film or paper is named.

While one piece of projection-like boss 202*c* is formed on an upper portion of the back side of the transparent plate 206, one piece of projection-like boss 202*d* is formed on a lower portion of the back side of the transparent plate 206. These bosses 202*c*, 202*d* are respectively fitted into small holes 133, 134 formed in the core material 103 so as to fix the display portion 109 to the core material 103.

Here, the characters or the pattern printed on the display body 204 which is laminated to the back side of the transparent plate 206 may be directly printed to the back side of the transparent plate 206. In this case, the display body 204 can be omitted.

As has been describe heretofore, according to the bowling pin of the present invention, the bowling pin exhibits the extremely excellent durability since the core material is formed of synthetic resin. Further, since the core material is formed in a hollow shape, the bowling pin satisfies the conditions such as the shape and the weight which are stipulated in the international standard and, at the same time, can generate a dry sound which is unique to the bowling pins which can dissipate a stress of a player when the bowling pin and the ball hit each other or the bowling pins hit each other.

Further, even when a compression force acts on the surface of the core material having the hollow portion at the time of performing the insert molding of the surface skin portion, since the deformation prevention material is fitted into the hollow portion, there is no possibility that the bowling pin is deformed.

Further, in performing the insert molding of the surface skin portion, the cap which eventually becomes a part of the product is used and hence, the bowling pin is economical and can be manufactured efficiently.

According to the bowling pin of the present invention, there is no peeling even when the display portion receives an impact or a friction and hence, the bowling pin can obtain the high durability. Accordingly, the reduction of cost can be realized in using the bowling pins.

Further, different from the conventional baking, it is possible to provide the vivid colors.

What is claimed is:

1. A bowling pin comprising: a core material made of synthetic resin and having a hollow portion, the hollow portion having upper and lower opening portions; caps fitted in the opening portions; and a surface skin portion made of hard synthetic resin which is molded on a surface of the core material and covers that one of said caps that is in said upper opening portion.

2. A bowling pin according to claim 1, wherein said surface skin portion is provided with a recessed portion, and said recessed portion is provided with a display body of synthetic resin, which displays at least one of letters and a pattern.

3. A bowling pin according to claim 2, wherein the synthetic resin which forms the display body has resiliency.

4. A bowling pin according to claim 1, wherein the bowling pin includes a base portion, a display body which is provided to the base portion and displays at least one of letters and a pattern, and a transparent portion which covers the display body and through which the letters and the pattern of the display body can be observed, and wherein a display portion which is constituted by a cover connected to the base portion is embedded in the surface skin portion in a state that a portion of the display portion is exposed.

5. A bowling pin according to claim 4, wherein the base and the cover are configured to be fitted to each other.

6. A bowling pin according to claim 4 or 5, wherein a synthetic resin which constitutes the cover has flexibility which is higher than flexibility of a synthetic resin which constitutes the base of the display body.

7. A bowling pin according to claim 4 or 5, wherein the display body has an exposure portion which is exposed from the surface skin portion and an embedded portion which is arranged around the exposed portion and is embedded in the surface skin portion which is formed lower than the exposed portion by one step.

8. A bowling pin according to claim 4 or 5, wherein at least one surface of the base on which the display body is arranged is colored.

9. A method of manufacturing a bowling pin, said method comprising: forming a core material having a hollow portion by injection molding, the hollow portion having upper and lower opening portions; fitting a deformation preventing material the inside of the upper opening portion of the hollow portion; setting the core material in a mold; and forming a surface skin portion made of a synthetic resin on the core material and the deformation preventing material by molding.

10. A method of manufacturing a bowling pin, said method comprising: forming a core material having a hollow portion by injection molding, the hollow portion having upper and lower opening portions; fitting a deformation preventing material the inside of the upper opening portion of the hollow portion; setting the core material in a mold; and forming a surface skin portion made of a synthetic resin on the core material and the deformation preventing material by molding, said method further comprising forming a projected display body on a surface of the core material using a synthetic resin before said step of forming the surface skin portion by molding, and wherein the surface skin portion is formed such that the display body is exposed.

11. A method of manufacturing a bowling pin, said method comprising: forming a core material having a hollow portion by injection molding, the hollow portion having upper and lower opening portions; fitting a deformation preventing material the inside of the upper opening portion of the hollow portion; setting the core material in a mold; and forming a surface skin portion made of a synthetic resin on the core material and the deformation preventing material by molding, said method further comprising: forming a recessed portion on the surface skin portion; and forming a display body of synthetic resin within the recessed portion.

12. The method of manufacturing a bowling pin according to claim 10 or 11, wherein the deformation preventing material is a cap that plugs the upper opening portion.

* * * * *